US010346901B1

(12) United States Patent
Serbanescu

(10) Patent No.: US 10,346,901 B1
(45) Date of Patent: Jul. 9, 2019

(54) COMPUTER GENERATION OF COMPOSITE IMAGES

(71) Applicant: Amazon Technologies, Inc., Seattle, WA (US)

(72) Inventor: Costin Serbanescu, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 518 days.

(21) Appl. No.: 14/963,968

(22) Filed: Dec. 9, 2015

(51) Int. Cl.
*G06Q 30/00* (2012.01)
*G06Q 30/06* (2012.01)
*G06T 11/60* (2006.01)
*G06Q 50/00* (2012.01)

(52) U.S. Cl.
CPC ......... *G06Q 30/0643* (2013.01); *G06Q 50/01* (2013.01); *G06T 11/60* (2013.01)

(58) Field of Classification Search
CPC .................................................... G06Q 30/06
USPC ....................................................... 705/26.1
See application file for complete search history.

(56) References Cited

U.S. PATENT DOCUMENTS

| | | | | |
|---|---|---|---|---|
| 9,254,081 | B2 * | 2/2016 | Kornilov | A61B 3/10 |
| 2007/0294142 | A1 * | 12/2007 | Kattner | G06Q 30/06 |
| | | | | 705/27.2 |
| 2014/0002444 | A1 * | 1/2014 | Bennett | G06F 3/012 |
| | | | | 345/419 |
| 2014/0176565 | A1 * | 6/2014 | Adeyoola | G06T 19/006 |
| | | | | 345/473 |
| 2015/0254711 | A1 * | 9/2015 | Chand | G06Q 30/0255 |
| | | | | 705/14.53 |
| 2015/0262282 | A1 * | 9/2015 | Walti | G06Q 30/0631 |
| | | | | 705/26.7 |
| 2015/0339757 | A1 * | 11/2015 | Aarabi | G06Q 30/06 |
| | | | | 705/12 |
| 2017/0017648 | A1 * | 1/2017 | Pearlman | G06K 9/46 |
| 2017/0039775 | A1 * | 2/2017 | Applegate | G06T 7/30 |
| 2017/0053158 | A1 * | 2/2017 | Kim | G06K 9/00335 |
| 2017/0352092 | A1 * | 12/2017 | Mitchell | G06T 15/503 |

* cited by examiner

*Primary Examiner* — Mila Airapetian
(74) *Attorney, Agent, or Firm* — Lee & Hayes, P.C.

(57) ABSTRACT

Accessing images associated with users for generating composite images and/or making product recommendations based at least partly on the images to enhance online shopping experiences is described. A service provider can access images associated with a user and identify a product of interest to the user. The service provider can determine a fitness score for an image of the images, the fitness score indicating an appropriateness of the image for presenting the product of interest via a device associated with the user, and select the image as a representative image based at least in part on the fitness score. The service provider can generate, from the representative image, a composite image that visually depicts a graphical representation of the product of interest and cause the composite image to be presented to the user via the device.

20 Claims, 7 Drawing Sheets

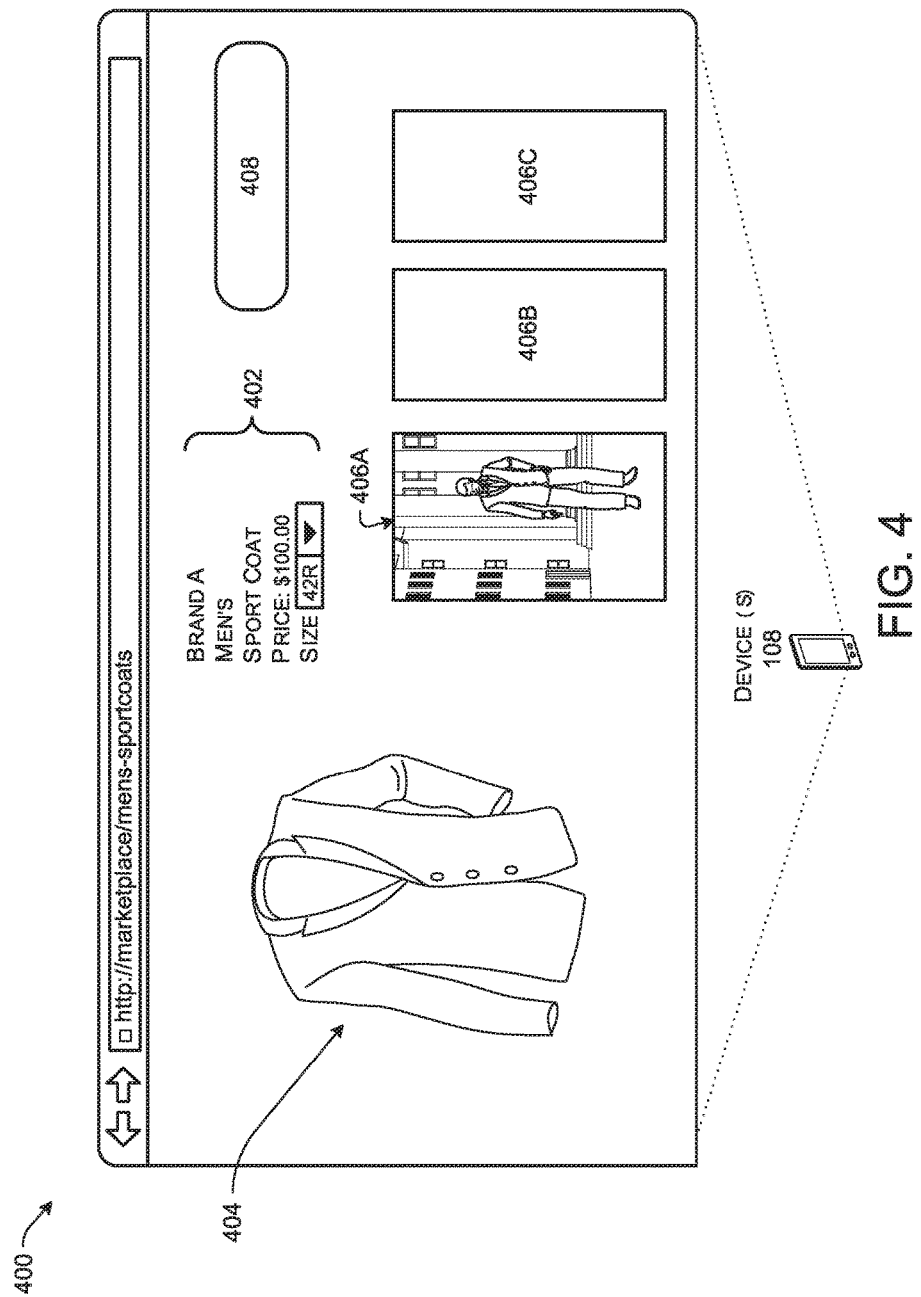

COMPUTER GENERATION OF COMPOSITE IMAGES

BACKGROUND

Online shopping has transformed retail in many ways. However, apparel is one area where consumers have not fully adopted the online shopping model. Consumers lack confidence in buying apparel online because of various concerns that are unique to the apparel industry. For instance, the apparel industry lacks size standardization, and fit varies from garment to garment. Furthermore, garments hang differently on different people. In brick-and-mortar stores, consumers may use fitting rooms to try on various garments prior to purchasing any of the garments. However, in online shopping models, consumers do not have the opportunity to try on desired garments before they buy the garments. Accordingly, consumers do not have the opportunity to see how the garment fits and/or hangs prior to purchasing the garment. As such, clothing purchased online is returned at a significantly higher rate than clothing purchased in brick-and-mortar stores and many customers abandon online clothing purchases prior to completing them.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 4 is a diagram showing an example user interface that may be presented to a user for viewing composite images.

DETAILED DESCRIPTION

Figure 1:
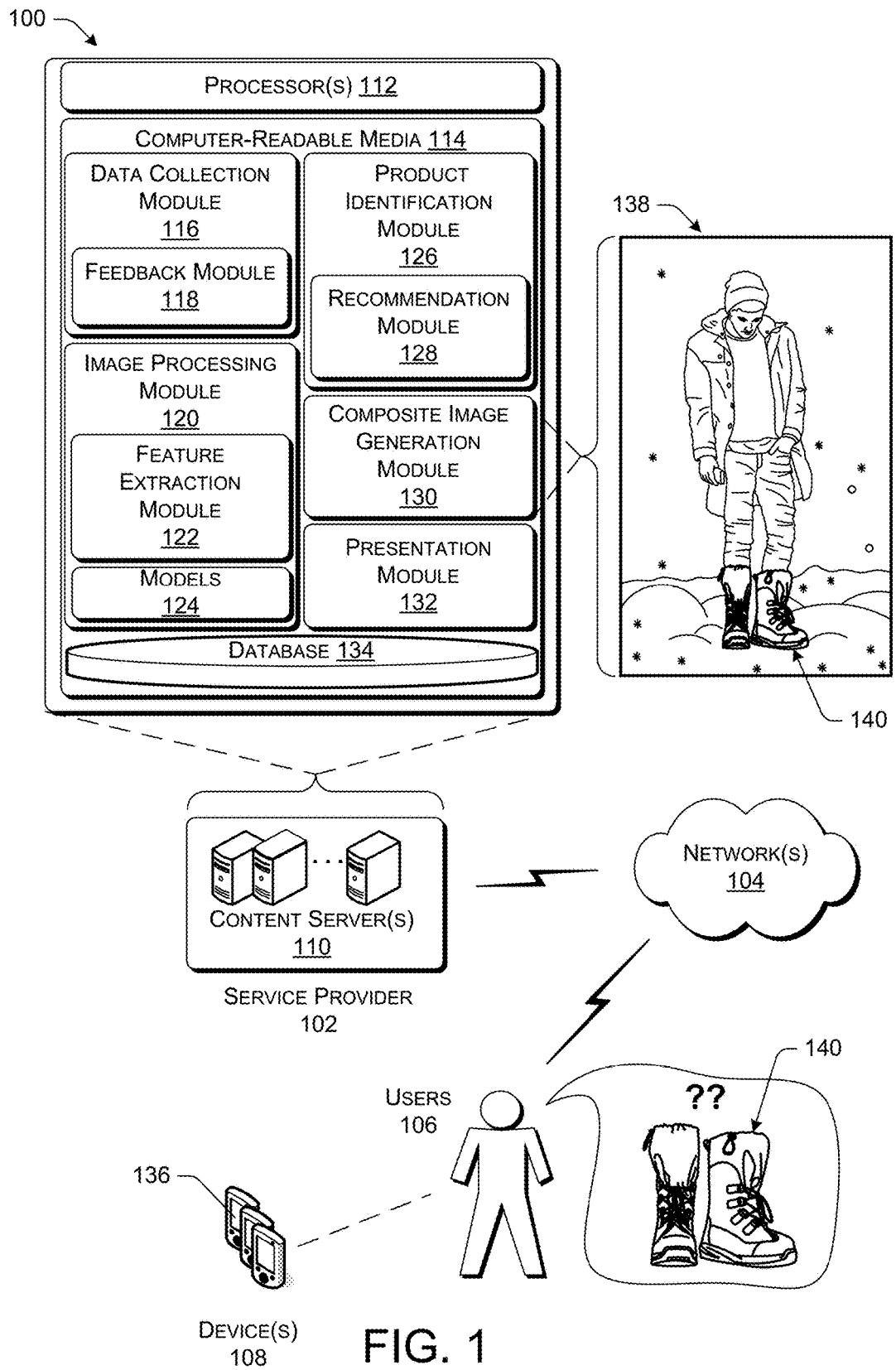
FIG. 1 is a diagram showing an example system for accessing images associated with users for generating composite images and/or making product recommendations based at least partly on the images to enhance online shopping experiences.

Techniques described herein leverage images associated with a consumer to enhance online shopping experiences. A service provider may access images associated with a consumer and, based at least in part on determining one or more products of interest to the consumer, may select one or more representative images from the images. The service provider may generate composite images in which graphical representations of the one or more products of interest may be augmented into individual representative images of the one or more representative images so that the consumer may see how he or she looks in the one or more products. The composite images may be provided to the consumer to aid the consumer in making purchasing decisions.

In at least one example, the service provider may determine one or more products of interest to the consumer. The service provider may offer the one or more products for acquisition on behalf of a merchant and/or the service provider. For illustrative purposes, the one or more products may include, but are not limited to, garments, shoes, jewelry, eyewear, headwear, handbags, home décor, furniture, bedding, bathroom accessories, electronics, office décor, office furniture, appliances, paint, etc. Based at least in part on determining the one or more products of interest to the consumer, the service provider may process images associated with the consumer to select one or more representative images. For illustrative purposes, representative images are images that, when considered holistically, are the most appropriate images for presenting one or more products in a composite image. One or more models may be applied to combinations of features and/or image data to identify one or more representative images.

As a non-limiting example, based at least in part on determining that a consumer is interested in a sport coat (i.e., the sport coat is the product of interest), the service provider may select an image of the consumer in an urban setting, with a full torso of the consumer's body visible, as a representative image (instead of a headshot of the consumer). Alternatively, based at least in part on determining that a consumer is interested in a semi-formal dress (i.e., the semi-formal dress is the product of interest), the service provider may select an image of the consumer at a more formal affair (e.g., a wedding, an awards banquet, a party, etc.) as a representative image (instead of a less formal setting such as a sporting event, or a playground). Or, based at least in part on determining that a consumer is interested in a hat (i.e., the hat is the product of interest), the service provider may select an image of the consumer that focuses on the consumer's head (instead of the consumer's feet) and may select an environment, season, and/or scene that corresponds to the use of the hat. For instance, an image depicting a sporting event may be selected as a representative image for a baseball hat or an image depicting an outdoors scene may be selected as a representative image for a hunting hat or ski beanie.

Based at least in part on selecting one or more representative images, the service provider may generate a composite image in which graphical representations of the one or more products of interest are augmented into individual representative images of the one or more representative images. Graphical representations of the one or more products can be augmented into individual representative images such that the graphical representations are rendered as a part of the individual images. That is, the graphical representations can supplement the individual images to generate the composite images. The composite images may be provided to a device corresponding to the consumer to aid the consumer in making purchasing decisions. For instance, in the context of apparel, the techniques described herein may present composite images to aid the consumer in determining how the consumer looks in the one or more products of interest. Or, in the context of home décor, the techniques described herein may provide composite images to aid the consumer in determining how an item of home décor looks in a space depicted in an image associated with the consumer (e.g., the consumer's living room, bedroom, etc.).

In additional and/or alternative examples, the service provider may determine features and/or data associated with the images to determine information about the consumer (e.g., activities the consumer participates in, sports teams the consumer supports, hobbies of the consumer, etc.) and recommend products to the consumer based on the information. For instance, the service provider may process the images and determine that the consumer enjoys fishing. Accordingly, the service provider may recommend fishing products to the consumer. Additionally and/or alternatively, the service provider may leverage geotags associated with the images to determine that the consumer likes to travel, and likes to travel to particular destinations. Accordingly, the service provider may recommend appropriate travel products to the consumer.

In at least one example, the service provider may generate recommendations that may be presented to the consumer via various mediums to recommend the products to the consumer. In such examples, the service provider may cause the recommendations to be presented to the consumer via a device corresponding to the consumer. For instance, the service provider may cause the recommendations to be presented to the consumer via a unique user interface that provides functionality for the consumer to view the recommendation and/or acquire the one or more products associated with the recommendation, a text message, an email, a push notification, etc. In some examples, the recommendation may include one or more composite images. Additionally and/or alternatively, the service provider may leverage one or more composite images to recommend products to the consumer. The composite images and/or recommendations may be presented to the consumer to aid the consumer in making purchasing decisions in online shopping environments.

FIG. 1 is a diagram of an example system 100 for accessing images associated with users for generating composite images and/or making product recommendations based at least in part on the images to enhance online shopping experiences. More particularly, the system 100 may include a service provider 102, one or more network(s) 104, one or more users 106, and one or more devices 108 associated with the one or more users 106.

The service provider 102 may be any entity, server(s), platform, etc., that provides items (e.g., products, services, etc.) to users 106 (e.g., consumers) on behalf of other users 106 (e.g., merchants) and/or the service provider 102. The service provider 102 may be implemented in a non-distributed computing environment or may be implemented in a distributed computing environment, possibly by running some modules on devices 108 or other remotely located devices. As shown, the service provider 102 may include one or more content server(s) 110, which may include one or more processor(s) 112 and computer-readable media 114. The content server(s) 110 may also include additional components not listed above that may perform any function associated with the content server(s) 110. In various embodiments, each of the content server(s) 110 may be any type of server, such as a network-accessible server.

In various examples, the service provider 102 may present items to consumers on behalf of itself, merchants, etc. The items may include products, services, etc. For the purpose of this discussion, the products may include, but are not limited to, garments, shoes, jewelry, eyewear, headwear, handbags, home décor, furniture, bedding, bathroom accessories, electronics, office décor, office furniture, appliances, paint, etc., as described above. In at least one example, the service provider 102 described herein may cause one or more user interfaces to be presented to consumers via devices 108 corresponding to the consumers that promote or feature the items offered by the service provider 102 or the merchants. The service provider 102 may access images associated with consumers who are interested in acquiring the items offered by the merchants and/or the service provider 102. Based at least in part on accessing the images, the service provider 102 may generate composite images and provide the composite images to devices 108 associated with individual consumers and/or make recommendations to individual consumers based partly on features extracted from the images and/or data associated with the images.

In some examples, the network(s) 104 may be any type of network known in the art, such as the Internet. Moreover, the service provider 102 and/or the devices 108 may communicatively couple to the network(s) 104 in any manner, such as by a wired or wireless connection. The network(s) 104 may facilitate communication between the content server(s) 110 and/or the devices 108 associated with the users 106.

The users 106 (e.g., consumers, merchants, etc.) may interact with the service provider 102 via a site (i.e., a website), a self-service merchant portal, a self-service interface, or in any other manner.

In at least one example, consumers may interact with the service provider 102 to acquire one or more items that are offered for acquisition on behalf of the merchants and/or the service provider 102. In some examples, the service provider 102 may generate and present user interfaces for presenting one or more products to a consumer. For the purpose of this discussion, such user interfaces may be called product pages. Product pages may display a product and information about the product, as illustrated and discussed in FIG. 4, below. In various examples, a consumer may acquire an item by actuating a control on a user interface presented on a display 136 of a device 108 to purchase the item. The control may be associated with a hyperlink or an overlay that directs the consumer to a new user interface and prompts the consumer to input information for purchasing the item (e.g., banking information, etc.). Based at least in part on purchasing the item over the computer network, the consumer may receive the item by physical mail. In some examples, a consumer may acquire one or more items on behalf of another user 106. For instance, a consumer may shop for a holiday gift or birthday gift for a family, friend, etc.

In at least one example, merchants may interact with the service provider 102 to offer one or more items for acquisition by consumers. In various examples, the merchants may be any individual or entity that is a source or a distributor of items that may be acquired by the consumers. For example, the merchants may include entities that provide products or services to consumers, which may be offered or promoted directly by the merchants or by the service provider 102 or on behalf of the merchants. The merchants may also offer those items via a physical location (e.g., a brick-and-mortar store), a merchant-branded merchant site (e.g., website), an intermediary marketplace, etc. The merchants may provide items to the consumers with the assistance of one or more devices 108, which may include any type of device.

In some examples, the users 106 may operate corresponding devices 108 to perform various functions associated with the devices 108, which may include at least some of the operations and/or modules discussed above with respect to the service provider 102.

As shown, the service provider 102 may include one or more content server(s) 110, which may include one or more processor(s) 112 and computer-readable media 114. In various examples, the processor(s) 112 may execute one or more modules and/or processes to cause the content server(s) 110 to perform a variety of functions, as set forth above and explained in further detail in the following disclosure. In some embodiments, the processor(s) 112 may include a central processing unit (CPU), a graphics processing unit (GPU), both CPU and GPU, or other processing units or components known in the art. Additionally, each of the processor(s) 112 may possess its own local memory, which also may store program modules, program data, and/or one or more operating systems.

In at least one configuration, the computer-readable media 114 of the content server(s) 110 may include any components that may be used to facilitate interaction between the service provider 102 and the devices 108. For example, the computer-readable media 114 may include a data collection module 116, which may include a feedback module 118, an image processing module 120, including at least a feature extraction module 122 and one or more models 124, a product identification module 126, which may include a recommendation module 128, a composite image generation module 130, a presentation module 132, and a database 134. Depending on the exact configuration and type of the content server(s) 110, the computer-readable media 114 may also include volatile memory (such as RAM), non-volatile memory (such as ROM, flash memory, miniature hard drive, memory card, or the like), or some combination thereof.

The data collection module 116 may receive data from the users 106 (e.g., merchants, consumers, etc.), the service provider 102, etc. In at least one example, the data collection module 116 may receive information associated with consumers such as user information and actions associated with a retail purchase account associated with a consumer (e.g., purchases, sales, items on a saved-items list (i.e., a wishlist), exchanges, returns, browsing history, search history, recommendations, personal demographic information, location proximity, calendar information, etc.). Additionally or alternatively, the data collection module 116 may access and observe user information and actions associated with third party sources and systems (e.g., social networks, professional networks, partner webstore purchases, etc.). The data corresponding to the user information may be mapped to a user profile corresponding to a consumer that may be stored in the database 134, cloud storage system, or other data repository.

The feedback module 118 may receive feedback data from the consumers. Consumers may provide feedback via a self-service website, application, or browser on a device 108, customer service, etc. Consumers may provide feedback relevant to previously recommended and/or acquired items, preferences, interests, likes/dislikes, complaints, etc. For instance, feedback data may include a type of feedback (e.g., positive, neutral, negative) and may include feedback provided directly from consumers, user ratings relating to items and/or merchants, user reviews of items and/or merchants, user responses to surveys and/or questionnaires, customer service feedback, information from sites (i.e., websites), and so on.

In some examples, the feedback data may include data associated with images. In at least one example, the feedback data associated with images may be explicitly provided. That is, consumers may provide explicit feedback that may include positive, neutral, or negative feedback with respect to particular images. For instance, a consumer may indicate that they like an image such that the image should be prioritized as a representative image, described below. Or, a consumer may indicate that they dislike an image such that the image should not be used as a representative image, as described below. Additionally and/or alternatively, a consumer may indicate that they like the image for use with a particular category of products (e.g., snow gear) but dislike the image for use with another category of products (e.g., outdoor gear). Furthermore, consumers may provide explicit feedback associated with composite images. For instance, a consumer can explicitly indicate that the consumer likes a composite image or dislikes a composite image.

In other examples, the feedback data associated with images may be implied. For instance, various heuristics may be utilized to imply that a consumer likes or dislikes an image. The feedback module 118 may monitor user actions with respect to individual images to imply whether a consumer likes or dislikes an image. In at least one example, the feedback module 118 may determine that a consumer likes an image based at least in part on determining that a consumer shared the image a number of times above a threshold, clicked on the image a number of times above a threshold, subsequently purchased a product represented in a composite image (e.g., converted) generated from the image a number of times above a threshold, etc. The feedback module 118 may utilize same and/or similar heuristics to imply whether a consumer likes or dislikes composite images.

In some examples, feedback data may be mapped to corresponding user profiles that may be stored in the database 134, cloud storage system, or other data repository. In other examples, feedback data associated with images and/or composite images may be associated with individual images and/or composite images via metadata associated with the individual images and/or composite images. As a result of accessing and/or receiving feedback data, the feedback module 118 may determine trends regarding what items, images, and/or composite images consumers prefer or like and what items, images, and/or composite images consumers complain about or dislike.

The image processing module 120 may access images and may process the images. The image processing module 120 may include a feature extraction module 122 for extracting image features from images. Furthermore, the image processing module 120 may include one or more models 124. The one or more models 124 may include image processing models (e.g., classifiers, object recognition models, etc.) for classifying images and/or recognizing objects in the images, trained machine learning models for determining fitness scores indicating how appropriate an image is for presenting one or more products, determining trends corresponding to a consumer based on features associated with images, recommending new products to consumers based on various data items, etc.

For the purposes of this discussion, an image may be a still image, a live image, a two-dimensional image, a three-dimensional image, a video, etc. The image processing module 120 may access images from various sources such as social networking application services (e.g., FLICKER®, FACEBOOK®, TUMBLR®, INSTAGRAM®, PINTEREST®, SNAPCHAT®, etc.), cloud storage repositories (e.g., AMAZON CLOUD DRIVE, GOOGLE DRIVE®, DROPBOX®, iCLOUD®, ONEDRIVE®, etc.), local storage repositories (e.g., database 134), remote storage repositories (e.g., databases associated with devices 108), etc. Additionally and/or alternatively, the image processing module 120 may receive images that are input by consumers. For instance, a consumer may upload one or more images via his or her device 108 and the image processing module 120 may access the uploaded images. In at least one example, a consumer may tag the uploaded images with metadata, as described below.

In some examples, the images may be accessed from public sources (e.g., public FACEBOOK® posts, public INSTAGRAM® accounts, public PINTEREST®, etc.). In other examples, the images may be accessed from private sources (e.g., private FACEBOOK® posts, private INSTAGRAM® accounts, private PINTEREST®, private storage repositories, etc.). In the examples where the images are associated with private sources, a consumer may be provided with notice that the systems and methods herein are accessing the images from the private sources. Additionally, prior to accessing images associated with private sources, consumers may have an opportunity to opt-in or opt-out of allowing the service provider 102 to access their images that are associated with private sources. For example, consumers may opt-in by taking affirmative action indicating that he or she consents to allowing the service provider 102 to access his or her images that are associated with private sources. Alternatively, consumers may be presented with an option to opt-out. An opt-out option may require an affirmative action to opt-out of allowing the service provider 102 to access images that are associated with private sources, and in the absence of affirmative user action to opt-out, access to images that are associated with private sources may be impliedly permitted.

The images may be associated with metadata. Metadata can have various formats including Information Interchange Model (IPTC), Extensible Metadata Platform (XMP), Exchangeable Image File (EXIF), Dublin Core Metadata Initiative (DCMI), Picture Licensing Universal System (PLUS), etc. The metadata may include details that are relevant to an image itself, as well as information about its production. The metadata may include technical metadata, descriptive metadata, administrative metadata, etc. Technical metadata may include image capturing details and settings, image capturing device brand and model, date and time that the image was captured, and/or Global Positioning System (GPS) location (i.e., geotags) where the image was created (as determined by geolocation devices). Descriptive metadata may include a name of an image creator, keywords related to the image, captions, titles, comments, etc. Keywords may identify one or more subjects depicted in an image, objects depicted in an image, activities depicted in an image, geographical locations depicted in an image, scenes depicted in an image, seasons depicted in an image, events depicted in an image, etc. Administrative metadata may include various rights, restrictions on use, contact information for an owner of the image, etc.

In some examples, the metadata may be added manually and edited through particular applications (e.g., GNU Image Manipulation Program (GIMP), ADOBE PHOTOSHOP, etc.) and/or added directly via an image capturing device. In other examples, the metadata may be generated automatically by the device 108 that captured the image and/or a service provider 102. For instance, in at least one example, the image processing module 120 may extract image features from the images via the feature extraction module 122 and apply one or more of the models 124 to image features extracted by the feature extraction module 122 to determine information about an image including, but not limited to, one or more subjects depicted in images, objects depicted in images, activities depicted in images, geographical locations depicted in images, scenes depicted in images, events depicted in images, seasons depicted in images, etc. In some examples, the one or more subjects depicted in images, objects depicted in images, activities depicted in images, geographical locations depicted in images, scenes depicted in images, events depicted in images, seasons depicted in images, etc. may be persistently associated with the image as descriptive metadata.

The feature extraction module 122 may extract image features from the images. For the purpose of this discussion, an image feature is a piece of information associated with an image that may be relevant for solving a computational task (e.g., identifying one or more subjects depicted in images, objects depicted in images, activities depicted in images, geographical locations depicted in images, scenes depicted in images, events depicted in images, seasons depicted in images, etc.). The feature extraction module 122 may extract low-level features (e.g., edge detection, corner detection, blob detection, ridge detection, scale-invariant feature transform, etc.), shape based features (e.g., thresholding, blob extraction, template matching, hough transform, etc.), etc. In at least one example, the image processing module 120 may leverage the extracted image features as input for one or more of the models 124 (e.g., the classifiers) to output one or more subjects depicted in images, objects depicted in images, activities depicted in images, geographical locations depicted in images, scenes depicted in images, events depicted in images, seasons depicted in images, etc. The classifiers may include machine learning algorithms such as AdaBoost, boosting, conceptual clustering, decision-tree learning, k-nearest neighbors algorithm, multi-label classification, multiclass classification, nearest neighbor search, support vector machines, neural networks, etc.

In additional and/or alternative examples, the image processing module 120 may utilize object recognition techniques for determining the descriptive metadata based on extracted image features. For instance, the object recognition techniques may include appearance-based methods (e.g., edge matching, greyscale matching, gradient matching, etc.), feature-based methods (e.g., interpretation trees, pose consistency, pose clustering, scale-invariant feature transform (SIFT), speeded up robust features (SURF), etc.), bag of words modeling, etc. Additional and/or alternative models 124 may be applied to the extracted image features for determining one or more subjects depicted in images, objects depicted in images, activities depicted in images, geographical locations depicted in images, scenes depicted in images, events depicted in images, seasons depicted in images, etc.

The image processing module 120 may utilize the extracted image features, image data, and/or product data for identifying representative images. Image data is a data associated with an image. Image data may include metadata, as described above. Additionally and/or alternatively, the image data may be based at least in part on characteristics of an image including quality of the image (e.g., resolution, brightness, saturation, etc.), clarity and/or saliency of subjects and/or objects in an image, size and/or scale of subjects and/or objects in an image, etc. Moreover, the image data may be based at least in part on the visibility of body regions (e.g., in an apparel example), etc.

As described above, representative images are images that, when considered holistically, are the most appropriate images for presenting one or more products in a composite image, described below. That is, a representative image may be determined based at least in part on the content of the representative image (e.g., descriptive metadata, i.e., subjects depicted in images, objects depicted in images, activities depicted in images, geographical locations depicted in images, scenes depicted in images, events depicted in images, seasons depicted in images, etc.), characteristics of an image including quality of the image (e.g., resolution, brightness, saturation, etc.), clarity and/or saliency of subjects and/or objects in an image, size and/or scale of subjects and/or objects in an image, etc. In some examples, a representative image may be the most appropriate image for a first product and may not be the most appropriate image for a second product. In other examples, a representative image may be the most appropriate image for a first product and for a second product.

In at least one example, the appropriateness of an image for a particular product may be based on a fitness score. The image processing module 120 may utilize one or more of the models 124 to determine the fitness score associated with an image based at least in part on image data associated with the image. In at least one example, one or more of the models 124 may be machine learning models that may compare the image data associated with an image with data associated with a product profile corresponding to a product (i.e., product data) to identify similarities between the image data and the product data. The machine learning models can include supervised learning algorithms (e.g., artificial neural networks, Bayesian statistics or networks, Gaussian process regression, logistic model trees, support vector machines, etc.), unsupervised learning algorithms (e.g., artificial neural networks, association rule learning, hierarchical clustering, cluster analysis, etc.), deep learning algorithms, etc.

In some examples, individual products may be associated with product profiles that are associated with metadata, tags, etc. that include data describing a corresponding product. In at least one example, the data may be manually added. In other examples, the data may be automatically added via a computing device (e.g., content servers 110). The data may identify the product, the size of the product, the fit of the product, the gender of an intended wearer of the product, the composition of the product (e.g., materials used to make the product), the price of the product, the manufacturer of the product, etc. The data associated with the product profile may identify a location on a consumer's body where the product should be worn and/or indicate portions of an image that should be visible for accurately depicting the product. The data associated with the product may positively and/or negatively identify activities associated with a product (e.g., activities where a product is likely/not likely to be used and/or worn), geographic locations associated with the product (e.g., where the product is likely/not likely to be worn and/or used), scenes associated with the product (e.g., scenes where the product is likely/not likely to be worn and/or used), events associated with a product (e.g., events where a product is likely/not likely to be used and/or worn), seasons associated with the product (e.g., seasons when the product is likely/not likely to be worn and/or used), etc. Additionally and/or alternatively, the data associated with the products may identify other products that may be related to the product.

One or more of the models 124 may compare the image data associated with the image with the product data to output a fitness score. The one or more of the models 124 can determine the fitness score based at least in part on determining a similarity between the image data and the product data. As a non-limiting example, the similarity can include same activities associated with a product of interest and an image, same geographic locations associated with a product of interest and an image, same scenes associated with a product of interest and an image, same seasons associated with a product of interest and an image, etc. A high fitness score (e.g., a fitness score above a threshold value or within a pre-determined range of values) indicates an image is highly appropriate for a particular product and therefore may be a representative image. A low fitness score (e.g., a fitness score below a threshold value or outside of a pre-determined range of values) indicates an image is not appropriate for a particular product and therefore may not be considered a representative image. In some examples, the image processing module 120 may select a predetermined number of images that have fitness scores above a predetermined threshold as representative images. In other examples, the image processing module may select an image with a highest fitness score as a representative image or a predetermined number of images with highest fitness scores. In some examples, each image may also be associated with a confidence score indicating a confidence level associated with the fitness score.

The product identification module 126 may identify products of interest to a consumer. The product identification module 126 may access data corresponding to user information associated with the consumer from the database 134, cloud storage system, or other data repository. Based at least in part on accessing the data corresponding to the user information associated with the consumer, the product identification module 126 may utilize data associated with a retail purchase account associated with the consumer to identify one or more products of interest to the consumer. For instance, the product identification module 126 may determine that products on a saved-items list (i.e., a wish-list) are products of interest to the consumer. Or, the product identification module 126 may determine that products in a browsing history and/or search history associated with the retail purchase account are products of interest to the consumer. In some examples, the product identification module 126 may determine that a product in a browsing history and/or search history is a product of interest to the consumer based at least in part on determining that the product has appeared in the browsing history and/or the search history above a threshold number of times, above a predetermined frequency, etc.

In additional and/or alternative examples, the product identification module 126 may determine that a product presented via a product page is a product of interest to the consumer based at least in part on determining a number of times that the consumer visited the product page. If the consumer visits the product page a number of times above a threshold number, the product identification module 126 may determine that the corresponding product is a product of interest. In some examples, product identification module 126 may determine that a product presented via a product page is a product of interest to the consumer based at least in part on determining that the consumer visited a product page a number of times above a threshold number within a period of time. Or, the product identification module 126 may determine that a product is a product of interest to a consumer based at least in part on determining that the amount of time that the consumer spends on a product page is above a threshold amount of time. Moreover, the product identification module 126 may determine that a product is a product of interest to a consumer based at least in part on determining that the consumer is currently interacting with and/or dwelling on the product page corresponding to the product. Additional and/or alternative means for determining that a product is a product of interest to the consumer are available.

In at least one example, the recommendation module 128 may identify and recommend products to consumers and such products may be considered products of interest to the consumers. In some examples, the recommendation module 128 may utilize data associated with a retail purchase account associated with the consumer to identify one or more products to recommend to the consumer. For instance, the recommendation module 128 may utilize data associated with user information and actions associated with the retail purchase account associated with a consumer (e.g., purchases, sales, items on a saved-items list (i.e., a wish-list), exchanges, returns, browsing history, search history, recommendations, personal demographic information, location proximity, calendar information, etc.) to determine new products to recommend to the consumer. Additionally or alternatively, the recommendation module 128 may utilize data associated with user information and actions associated with third party sources and systems (e.g., social networks, professional networks, partner webstore purchases, etc.) to determine new products to recommend to the consumer. Moreover, in some examples, the recommendation module 128 may utilize feedback data to determine new products to recommend to the consumer. One or more of the models 124 may be utilized for determining new products to recommend to consumers leveraging data associated with user information and actions associated with the retail purchase account, data associated with user information and actions associated with third party sources and systems, and/or feedback data.

Additionally and/or alternatively, the recommendation module 128 may leverage image data associated with the images to identify products that might be of interest to a consumer. In at least one example, one or more of the models 124 may utilize image data to determine information associated with the consumer. That is, the recommendation module 128 may leverage one or more of the models 124 and the image data to identify trends that are depicted in the images associated with the consumer. Based at least partly on the identified trends, the recommendation module 128 may identify preferences, likes, dislikes, etc. associated with the consumer. For instance, as a non-limiting example, the recommendation module 128 may determine that a consumer likes to play basketball, drink wine, etc. Based at least in part on identifying preferences, likes, dislikes, etc. associated with consumers, the recommendation module 128 may recommend new products to the consumers. In some examples, the recommendation module 128 may identify products that might be of interest to a user 106 based at least in part on identifying that a number of images associated with the same and/or similar image data exceeds a threshold number. For instance, as a non-limiting example, based at least in part on identifying that a number of images that are associated with postings of a travel destination exceeds a threshold number, the recommendation module 128 may recommend products associated with travel, including but not limited to, luggage, travel clothing, plug adapters, etc. In some examples, the recommendation module 128 may determine that the images are associated with a same travel destination and may leverage additional and/or alternative information to recommend products specific to the same travel destination.

In other examples, various additional and/or alternative heuristics may be utilized to identify products that might be of interest to a consumer based at least partly on image data associated with the images. For instance, the recommendation module 128 may determine that a consumer is associated with a number of images that is greater than a number of images associated with other consumers. For instance, a first consumer may have posted thousands of photos, whereas other consumers have only posted hundreds of photos. The recommendation module 128 may determine that the first consumer is interested in photography and may recommend cameras and/or camera equipment to the first consumer. Or, the recommendation module 128 may determine that geotags associated with images associated with the consumer indicate that the consumer likes to travel. Accordingly, the recommendation module 128 may recommend travel apparel, suitcases, travel handbooks, etc. to the consumer.

The composite image generation module 130 may generate composite images. A composite image is a manipulated or modified image. For the purposes of this discussion, the composite image generation module 130 may augment graphical representations corresponding to one or more products of interest into representative images. That is, graphical representations of the one or more products can be augmented into individual representative images such that the graphical representations are rendered as a part of the individual images. As such, the graphical representations can supplement the individual images to generate the composite images. In some examples, a graphical representation of a product (e.g., a lamp) may be augmented in a scene in the image so that a consumer may see how the product looks in the scene. In other examples, the graphical representations of one or more products of interest (e.g., garments) may be augmented on top of a graphical representation of the consumer in the image so that the consumer can see how he or she looks in the product. In such examples, the graphical representations of the one or more products of interest may augment the graphical representation of the consumer so as to conform or map to an outline of the graphical representation corresponding to the consumer so that the consumer appears to be wearing the one or more products of interest in the representative image. That is, the composite image generation module 130 may apply translations and scaling to graphical representations of products to ensure that the graphical representations are properly positioned in the representative images.

In some examples, the composite image generation module 130 may generate the composite image and may send corresponding image data to the presentation module 132 for causing the composite image to be rendered on a display 136 of a device 108 utilizing rasterization, ray casting, and/or additional rendering technologies. An example of a composite image 138 is illustrated in FIG. 1 and also in FIG. 3B. As illustrated in composite image 138, a consumer (e.g., user 106) is depicted in an image with a graphical representation of the product of interest (e.g., boots 140) augmenting the graphical representation of the consumer in the composite image 138 so that the consumer appears to be wearing the product of interest (e.g., boots 140).

In additional and/or alternative examples, the composite image generation module 130 may generate a composite video whereby a consumer that is depicted in the video can appear to be wearing the product of interest. In such examples, the composite image generation module 130 may render 3D graphical representations of one or more products of interest such that the graphical representations map to an outline of a graphical representation of the consumer and appear to move consistent with the movement of the consumer.

The presentation module 132 may cause one or more composite images to be presented to the consumer via a display 136 of a device 108. In at least one example, the one or more composite images may be added to a product page, as described above, and as illustrated in FIG. 4 below. In some examples, the consumer may actuate a control or a hyperlink on the product page to access the one or more composite images. The presentation module 132 can cause the one or more composite images to be presented to the consumer via additional and/or alternative techniques.

Additionally and/or alternatively, the presentation module 132 may generate recommendations to recommend a product to a consumer and may cause the recommendations to be presented to the consumer via a display 136 of a device 108. For instance, the presentation module 132 may cause the recommendations to be presented to the consumer via a unique user interface that provides functionality for the consumer to view the recommendation and/or acquire the one or more products associated with the recommendation, a text message, an email, a push notification, etc. Additionally and/or alternatively, a recommendation may include one or more composite images. The presentation module 132 may cause recommendations and/or composite images to be presented to a consumer in predetermined time intervals, at a predetermined frequency, on or before a date, etc.

The database 134 may store at least some data including data associated with user profiles, user information, feedback data, images, etc. User profile(s) may correspond to one or more user profiles associated with the service provider 102. In some examples, a user profile may include information associated with a consumer such as user information and actions associated with a retail purchase account associated with a consumer, user information and actions associated with third party sources and systems, feedback data, etc. In at least one example, images may be mapped to user profile(s). In some examples, the images may be images that have previously been determined to be representative images of the consumer associated with the user profile. Or, in other examples, the images may be images that the consumer associated with the user profile has indicated are preferred images and/or uploaded for use with the technologies described herein. The database 134 may store metadata associated with the images. In additional or alternative examples, at least some of the data may be stored in a cloud storage system or other data repository.

FIGS. 2 and 5-7 describe example processes for accessing images associated with users 106 (e.g., consumers) for generating composite images and/or making product recommendations based at least partly on the images to enhance online shopping experiences. The example processes are described in the context of the environment of FIG. 1 but are not limited to that environment. The processes are illustrated as logical flow graphs, each operation of which represents a sequence of operations that may be implemented in hardware, software, or a combination thereof. In the context of software, the operations represent computer-executable instructions stored on one or more computer-readable media 114 that, when executed by one or more processors 112, perform the recited operations. Generally, computer-executable instructions include routines, programs, objects, components, data structures, and the like that perform particular functions or implement particular abstract data types.

The computer-readable media 114 may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media appropriate for storing electronic instructions. In addition, in some embodiments the computer-readable media 114 may include a transitory computer-readable signal (in compressed or uncompressed form). Examples of computer-readable signals, whether modulated using a carrier or not, include, but are not limited to, signals that a computer system hosting or running a computer program may be configured to access, including signals downloaded through the Internet or other networks. The order in which the operations are described is not intended to be construed as a limitation, and any number of the described operations may be combined in any order and/or in parallel to implement the process. Furthermore, the operations described below may be implemented on a single device or multiple devices.

Figure 2:
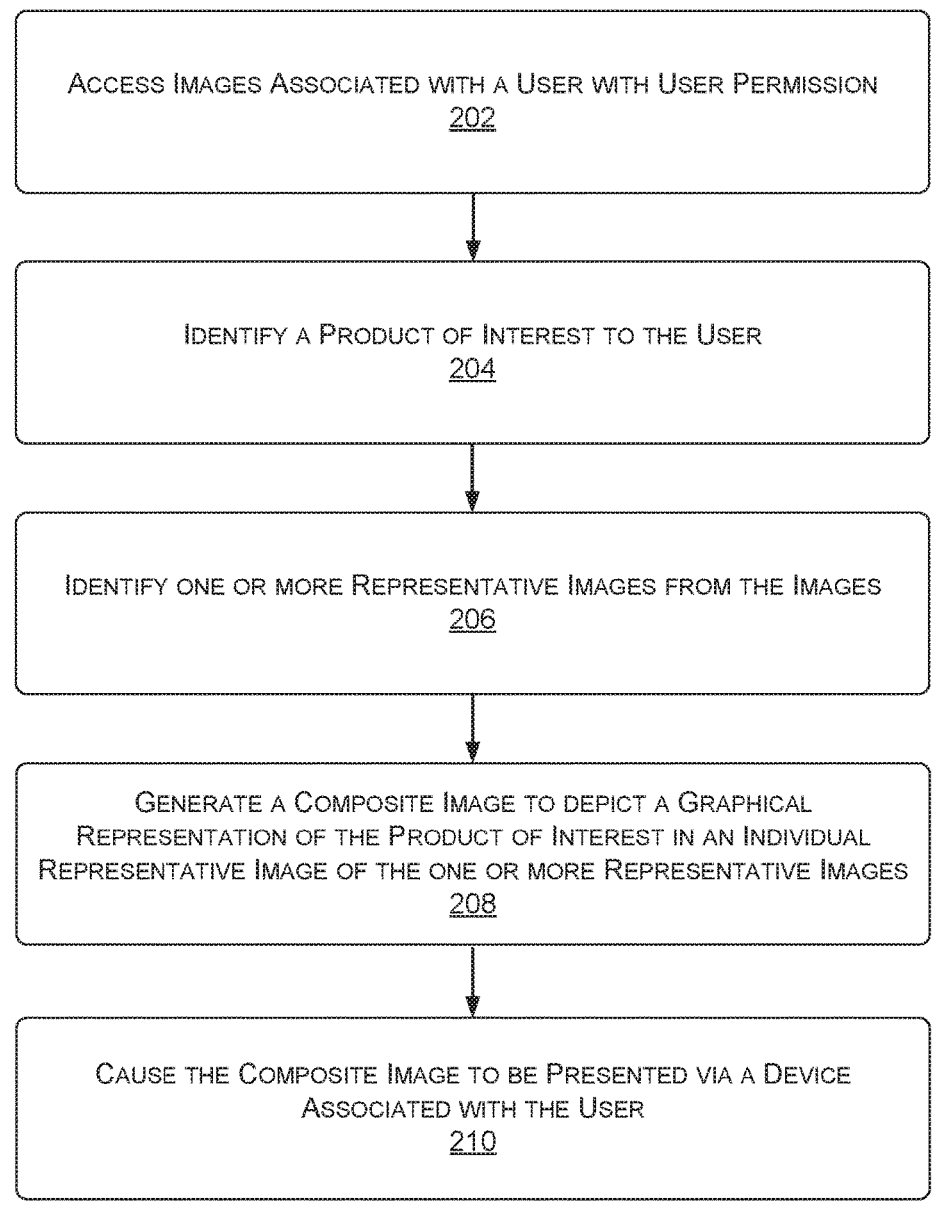
FIG. 2 is a flow diagram showing an illustrative process to generate and present a composite image to a consumer to enhance online shopping experiences.

FIG. 2 is a flow diagram showing an illustrative process 200 for generating and presenting a composite image to a consumer to enhance online shopping experiences.

Block 202 illustrates accessing images associated with a user 106 (e.g., consumer). The image processing module 120 may access images from various sources such as social networking application services, cloud storage repositories, local storage repositories, remote storage repositories, etc., as described above. Additionally and/or alternatively, the image processing module 120 may receive images that are input by users 106. For instance, a user 106 may upload one or more images via his or her device 108 and the image processing module 120 may access the uploaded one or more images.

Block 204 illustrates identifying a product of interest to the user 106 (e.g., consumer). Based at least in part on accessing the data corresponding to the user information associated with the consumer, the product identification module 126 may utilize data associated with a retail purchase account associated with the consumer to identify one or more products of interest to the consumer. For instance, the product identification module 126 may determine that products on a saved-items list (i.e., a wish-list) are products of interest to the consumer. Or, the product identification module 126 may determine that products in a browsing history and/or search history associated with the retail purchase account are products of interest to the consumer. In some examples, the product identification module 126 may determine that a product in a browsing history and/or search history is a product of interest to the consumer based at least in part on determining that the product has appeared in the browsing history and/or the search history above a threshold number of times, above a predetermined frequency, etc.

As described above, the product identification module 126 may determine that a product presented via a product page is a product of interest to the consumer based at least in part on determining a number of times that the consumer visits a corresponding product page. If the consumer visits the product page a number of times above a threshold number, the product identification module 126 may determine that the corresponding product is a product of interest. In some examples, product identification module 126 may determine that a product presented via a product page is a product of interest to the consumer based at least in part on determining that the consumer visited a product page a number of times above a threshold number within a period of time. Or, the product identification module 126 may determine that a product is a product of interest to a consumer based at least in part on determining that the amount of time that the consumer spends on a product page is above a threshold amount of time. Moreover, the product identification module 126 may determine that a product is a product of interest to a consumer based at least in part on determining that the consumer is currently interacting with and/or dwelling on the product page corresponding to the product.

Additionally and/or alternatively, the recommendation module 128 may identify and recommend products to consumers and such products may be considered products of interest to the consumers. In some examples, the recommendation module 128 may utilize data associated with a retail purchase account associated with the consumer to identify one or more products to recommend to the consumer. Additionally or alternatively, the recommendation module 128 may utilize data associated with user information and actions associated with third party sources and systems (e.g., social networks, professional networks, partner webstore purchases, etc.) to determine new products to recommend to the consumer. Moreover, in some examples, the recommendation module 128 may utilize feedback data to determine new products to recommend to the consumer. In other examples, the recommendation module 128 may leverage image data associated with the images, as described above, to identify products that might be of interest to a consumer. For illustrative purposes, a non-limiting example of a product of interest may be a sport coat.

In at least one example, the product identification module 126 may identify a single product of interest to a consumer. In other examples, the product identification module 126 may identify two or more products of interest to a consumer. In such examples, the two or more products of interest may be related by the merchant and/or the service provider 102 offering the two or more products for acquisition by the consumer. That is, product data associated with the two or more products may indicate that the products are related. In additional and/or alternative examples, at least one of the two or more products may be recommended by the recommendation module 128.

Block 206 illustrates identifying one or more representative images from the images. The image processing module 120 may identify representative images from the images. As described above, the appropriateness of an image for a particular product may be based on a fitness score determined based at least in part on applying image data and product data to one or more of the models 124. That is, one or more of the models 124 may output the fitness score. A high fitness score (e.g., a fitness score above a threshold value or within a pre-determined range of values) indicates an image is highly appropriate for a particular product and therefore may be a representative image. A low fitness score (e.g., a fitness score below a threshold value or outside a pre-determined range of values) indicates an image is not appropriate for a particular product and therefore may not be considered a representative image. Additional details associated with identifying one or more representative images are described in FIG. 5.

In the non-limiting example described above, based at least in part on determining that the product of interest is a sport coat, the image processing module 120 may leverage one or more of the models 124 to select an image of the consumer in an urban setting, when an entirety of the consumer's body is visible, as a representative image. FIG. 3A illustrates an example of a representative image 300 of the consumer (e.g., user 106) in an urban setting.

Returning to FIG. 2, block 208 illustrates generating a composite image to depict a graphical representation of the product of interest in an individual representative image of the one or more representative images. The composite image generation module 130 may generate composite images, as described above. The composite image generation module 130 may augment a graphical representation of one or more products of interest into a representative image such that the graphical representations of the one or more products supplement the content of the representative image. In some examples, a graphical representation of a product (e.g., a lamp) may be augmented in a scene in the image so that a consumer may see how the product looks in the scene. In other examples, the graphical representations of one or more products of interest (e.g., apparel) may be augmented on top of a graphical representation of the consumer in the image so that the user 106 may see how he or she looks in the product. In such examples, the graphical representations of the one or more products of interest may augment the graphical representation of the consumer so as to conform or map to an outline of a graphical representation corresponding to the consumer so that the consumer appears to be wearing the one or more products of interest in the representative image. That is, the composite image generation module 130 may apply translations and scaling to graphical representations of products to ensure that the graphical representations are properly positioned.

Figure 3B:
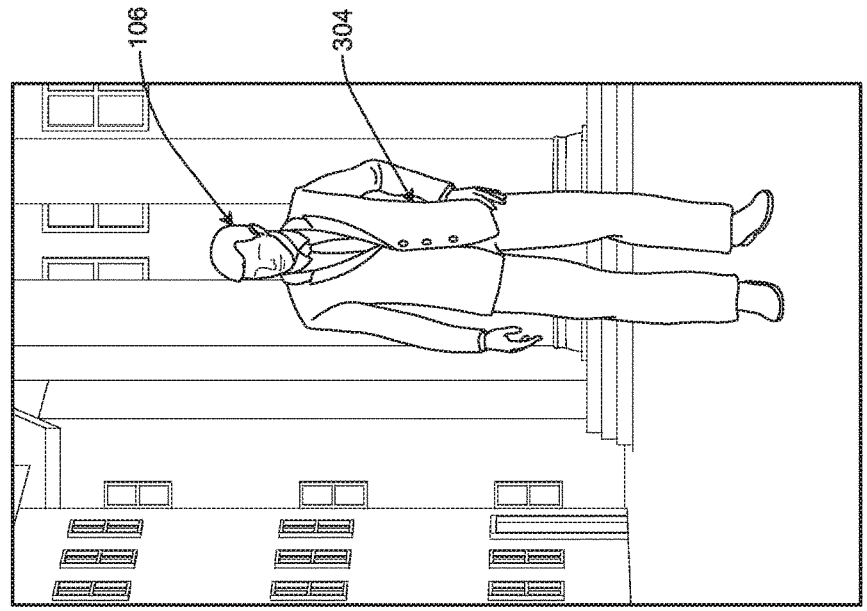
FIG. 3B is a diagram showing an example of a composite image based at least in part on the representative image illustrated in FIG. 3A.
Figure 3A:
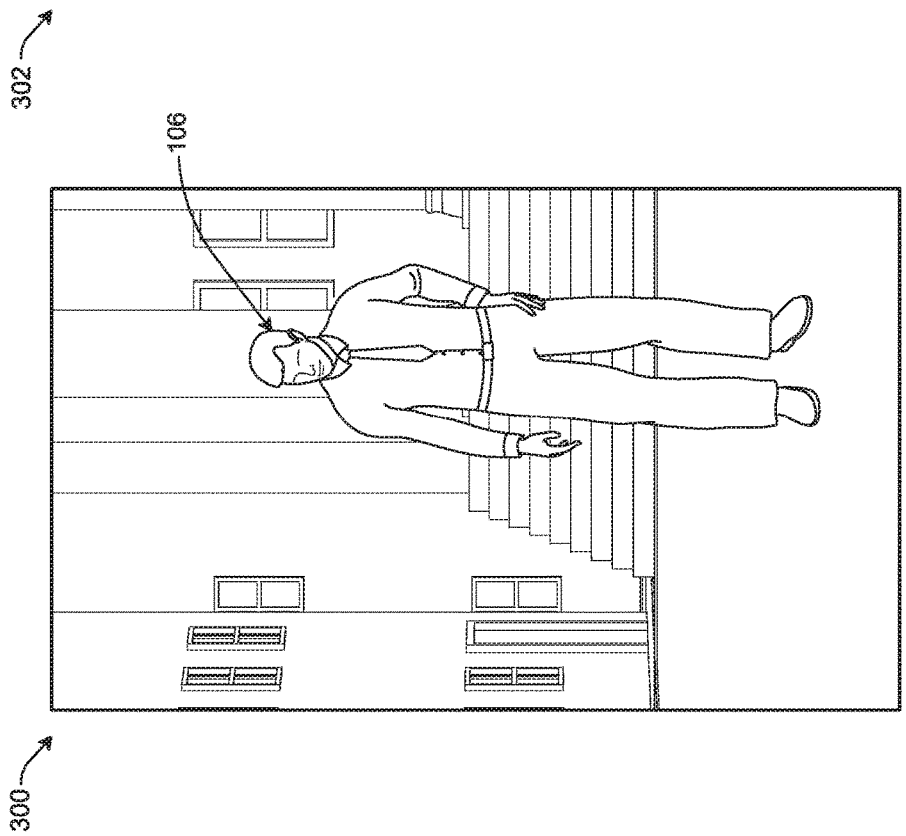
FIG. 3A is a diagram showing an example of a representative image.

FIG. 3B is a diagram showing an example of a composite image 302 based at least in part on the image 300 in FIG. 3A. As illustrated in composite image 302, the product of interest described in the non-limiting example above (e.g., sport coat 304) is depicted augmenting the consumer (e.g., user 106). That is, a graphical representation of the sport coat 304 is depicted so as to augment the graphical representation of the consumer.

Returning to FIG. 2, block 210 illustrates causing the composite image to be presented via a device 108 corresponding to the user 106 (e.g., consumer). The presentation module 132 may cause one or more composite images to be presented to the consumer via a display 136 of a device 108. For instance, the service provider may cause the one or more composite images to be presented to the consumer via a unique user interface that provides functionality for the consumer to view the one or more composite images and/or acquire the one or more products associated with the one or more composite images, a text message, an email, a push notification, etc. In at least one example, the one or more composite images may be added to a product page, as described above, and as illustrated in FIG. 4.

FIG. 4 is a diagram showing an example user interface 400 (i.e., a product page) that may be presented to a consumer for viewing composite images and/or acquiring one or more products depicted in the composite images. The presentation module 132 may cause a user interface (e.g., user interface 400) to be presented to a consumer utilizing any communication channel, such as an e-mail message, a site (e.g., website) associated with the service provider 102, a text message, a push notification, a social network site, an application that is associated with the service provider 102 and that resides on device(s) 108 corresponding to the consumer, etc.

As a non-limiting example, the user interface 400 may include product information 402 that describes the product of interest and one or more images, graphical representations, etc., 404 that represent the product of interest. For instance, the product information 402 may include a brand of the product, a price of the product, a size of the product, descriptive information about the product, etc. In at least some examples, a consumer may select a size from a drop down menu. In other examples, the service provider 102 may recommend a size for the consumer. The user interface 400 may include one or more composite images (e.g., 406A, 406B, 406C, etc.). Each of the composite images (e.g., 406A, 406B, 406C, etc.) may be different images. For instance, in at least one example, each of the composite images (e.g., 406A, 406B, 406C, etc.) may depict the consumer from a different perspective. Or, in an alternative example, each of the composite images (e.g., 406A, 406B, 406C, etc.) may depict the consumer from a same perspective but in a different geographical location, different scene, etc. A consumer may acquire the product by actuating a control 408 or by providing another indication that he or she would like to acquire the product. The user interface 400 is one example of a user interface that facilitates the acquisition of a product and display of one or more composite images (e.g., 406A, 406B, 406C, etc.), and any other presentation or configuration may be used.

Figure 5:
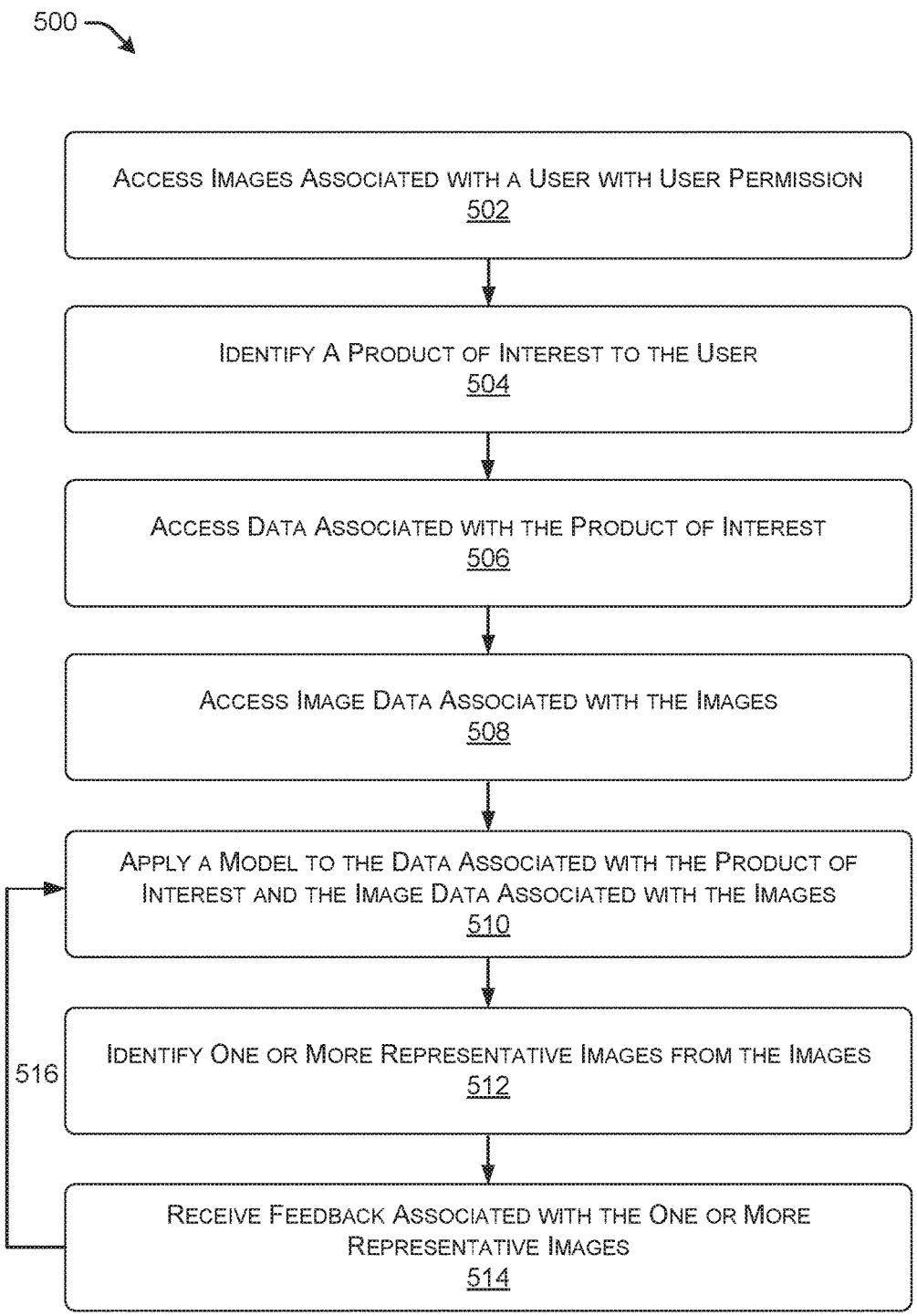
FIG. 5 is a flow diagram showing an illustrative process to identify one or more representative images.

FIG. 5 is a flow diagram showing an illustrative process 500 to identify one or more representative images.

Block 502 illustrates accessing images associated with a user 106 (e.g., consumer). The image processing module 120 may access images from various sources such as social networking application services, cloud storage repositories, local storage repositories, remote storage repositories, etc., as described above. Additionally and/or alternatively, the image processing module 120 may receive images that are input by users 106. For instance, a user 106 may upload one or more images via his or her device 108 and the image processing module 120 may access the uploaded one or more images.

Block 504 illustrates identifying a product of interest to the user 106 (e.g., consumer), as described above. Based at least in part on accessing the data corresponding to the user information associated with the consumer, the product identification module 126 may utilize data associated with a retail purchase account associated with the consumer to identify one or more products of interest to the consumer. For instance, the product identification module 126 may determine that products on a saved-items list (i.e., a wishlist) are products of interest to the consumer. Or, the product identification module 126 may determine that products in a browsing history and/or search history associated with the retail purchase account are products of interest to the consumer. In some examples, the product identification module 126 may determine that a product in a browsing history and/or search history is a product of interest to the consumer based at least in part on determining that the product has appeared in the browsing history and/or the search history above a threshold number of times, above a predetermined frequency, etc.

As described above, the product identification module 126 may determine that a product presented via a product page is a product of interest to the consumer based at least in part on determining a number of times that the consumer visits a corresponding product page. If the consumer visits the product page a number of times above a threshold number, the product identification module 126 may determine that the corresponding product is a product of interest. In some examples, product identification module 126 may determine that a product presented via a product page is a product of interest to the consumer based at least in part on determining that the consumer visited a product page a number of times above a threshold number within a period of time. Or, the product identification module 126 may determine that a product is a product of interest to a consumer based at least in part on determining that the amount of time that the consumer spends on a product page is above a threshold amount of time. Moreover, the product identification module 126 may determine that a product is a product of interest to a consumer based at least in part on determining that the consumer is currently interacting with and/or dwelling on the product page corresponding to the product.

Additionally and/or alternatively, the recommendation module 128 may identify and recommend products to consumers and such products may be considered products of interest to the consumers. In some examples, the recommendation module 128 may utilize data associated with a retail purchase account associated with the consumer to identify one or more products to recommend to the consumer. Additionally or alternatively, the recommendation module 128 may utilize data associated with user information and actions associated with third party sources and systems (e.g., social networks, professional networks, partner webstore purchases, etc.) to determine new products to recommend to the consumer. Moreover, in some examples, the recommendation module 128 may utilize feedback data to determine new products to recommend to the consumer. In other examples, the recommendation module 128 may leverage image data associated with the images, as described above, to identify products that might be of interest to a consumer.

In at least one example, the product identification module 126 may identify a single product of interest to a consumer or two or more products of interest to a consumer, as described above.

Block 506 illustrates accessing data associated with the product of interest. As described above, individual products may be associated with product profiles (e.g., product data) that are associated with metadata, tags, etc. that include data describing a corresponding product. The data may identify the product, the size of a product, the fit of the product, the intended gender of a wearer of the product, the composition of the product (e.g., materials used to make the product), the price of the product, the manufacturer of the product, etc. The data associated with the product profile may identify a location on a consumer's body where the product should be worn and/or indicate portions of an image that should be visible for accurately depicting the product. The data associated with the product may positively and/or negatively identify activities associated with a product (e.g., activities where a product is likely/not likely to be used and/or worn), geographic locations associated with the product (e.g., where the product is likely/not likely to be worn and/or used), scenes associated with the product (e.g., scenes where the product is likely/not likely to be worn and/or used), events associated with a product (e.g., events where a product is likely/not likely to be used and/or worn), seasons associated with the product (e.g., seasons when the product is likely/not likely to be worn and/or used), etc. Additionally and/or alternatively, the data associated with the products may identify other products that may be related to product.

In some examples, a consumer may be shopping for another person (e.g., friend, family, etc.). In such examples, the consumer may indicate that the product is for another person and/or specify the particular person who is the intended wearer and data indicating that the intended wearer is a particular person may be associated with the product for the purpose of identifying one or more representative images.

Block 508 illustrates accessing image data associated with the images. As described above, image data may include metadata. Additionally and/or alternatively, the image data may be based at least in part on characteristics of an image including quality of the image (e.g., resolution, brightness, saturation, etc.), clarity and/or saliency of subjects and/or objects in an image, size and/or scale of subjects and/or objects in an image, etc. Moreover, the image data may be based at least in part on the visibility of body regions (e.g., in an apparel example), etc.

Block 510 illustrates applying a model to the data associated with the product and the image data associated with the images. One or more of the models 124 may compare the image data associated with individual images with the product data associated with a product to output a fitness score for the individual images. A high fitness score (e.g., a fitness score above a threshold value or within a predetermined range of values) indicates that an image is highly appropriate for a particular product and therefore may be a representative image. A low fitness score (e.g., a fitness score below a threshold value or outside a pre-determined range of values) indicates that an image is not appropriate for a particular product and therefore may not be considered a representative image.

As described above, in some examples, the product identification module 126 may identify two or more products of interest. In such examples, additional and/or alternative models of the one or more models 124 and/or techniques may be used for determining fitness scores for particular images. In some examples, product data for a first product and product data for a second product may be combined and the combined product data may be compared to the image data for determining the fitness score for individual images. Alternatively, in other examples, one or more first images may be determined to be representative images for a first product and one or more second images may be determined to be representative images for a second product. In such examples, one or more of the models 124 may compare the one or more first images and the one or more second images to determine whether any of the images are the same. Based at least in part on identifying one or more images that are the same in the one or more first images and the one or more second images, the image processing module 120 may select the same one or more images as one or more representative images. If a plurality of images are the same in the one or more first images and the one or more second images, the image processing module 120 may leverage fitness scores as described below to identify the one or more representative images.

Block 512 illustrates identifying one or more representative images from the images. As described above, in some examples, the image processing module 120 may select a predetermined number of images that have fitness scores above a predetermined threshold as representative images. In other examples, the image processing module may select an image with a highest fitness score as a representative image or a number of images with highest fitness scores as representative images. In some examples, each image may also be associated with a confidence score indicating a confidence level associated with the fitness score.

In some examples, a consumer may be shopping for him or herself. Accordingly, the one or more representative images may depict the consumer. In additional and/or alternative examples, a consumer may be shopping for another person (e.g., friend, family, etc.). In such examples, the one or more representative images may depict the other person based at least in part on the consumer indicating the intended recipient of the product, as described above.

As described above, in some examples, images determined to be representative images may be stored in the database 134, mapped to the user profile corresponding to the consumer. Accordingly, prior to identifying new representative images each time a consumer is interested in a new product, the image processing module 120 may access representative images stored in the database 134. In such examples, the image processing module 120 may access the representative images stored in the database 134 and may access one or more of the models 124 to compare the image data associated with the representative images with the product data associated with the new product to output fitness scores for each of the representative images. In some examples, a representative image stored in the database 134 may have a fitness score sufficient to use for presenting the new product of interest to the consumer. That is, the fitness score may be above a threshold value or within a pre-determined range of values. In other examples, a representative image stored in the database 134 may not have a fitness score sufficient to use for presenting the new product of interest to the consumer. That is, the fitness score may be below a threshold value or outside of a pre-determined range of values. In such examples, the image processing module 120 may repeat process 500 to identify one or more representative images with fitness scores sufficient to use for presenting the new product of interest to the consumer (e.g., fitness scores above a threshold value or within a pre-determined range of values).

In at least one example, a consumer may opt-in or opt-out of allowing the service provider 102 to store representative images in the database 134. For example, consumers may opt-in by taking affirmative action indicating that he or she consents to allowing the service provider 102 to store representative images in the database 134. Alternatively, consumers may be presented with an option to opt-out. An opt-out option may require an affirmative action to opt-out of allowing the service provider 102 to store representative images in the database 134, and in the absence of affirmative user action to opt-out, permission for the service provider 102 to store representative images in the database 134 may be implied.

Block 514 illustrates receiving feedback associated with the one or more representative images. As described above, the feedback module 118 may receive feedback data. In some examples, the feedback data may include data associated with composite images, as described above. That is, consumers may provide explicit feedback that may include positive, neutral, or negative feedback with respect to particular composite images. For instance, a consumer may indicate that the consumer liked the composite image and/or the product displayed in the composite image. In other examples, the feedback data associated with composite images may be implied. For instance, various heuristics may be utilized to imply that a consumer likes or dislikes a composite image. The feedback module 118 may monitor consumer actions with respect to individual composite images to imply whether a consumer likes or dislikes a composite image. In at least one example, the feedback module 118 may determine that a consumer likes a composite image based at least in part on determining that a consumer shared the composite image a number of times above a threshold, clicked on the composite image a number of times above a threshold, subsequently purchased a product represented in the corresponding composite image (e.g., converted) a number of times above a threshold, etc. Feedback data associated with composite images may be mapped to the representative image used to generate the composite image and, in some examples, may be persistently stored as metadata. The feedback data may be integrated into the data utilized to determine a fitness score, as illustrated by line 516. That is, the one or more models 124 may utilize feedback data, in addition the data associated with the product and the image data associated with the images, to output a fitness score.

Figure 6:
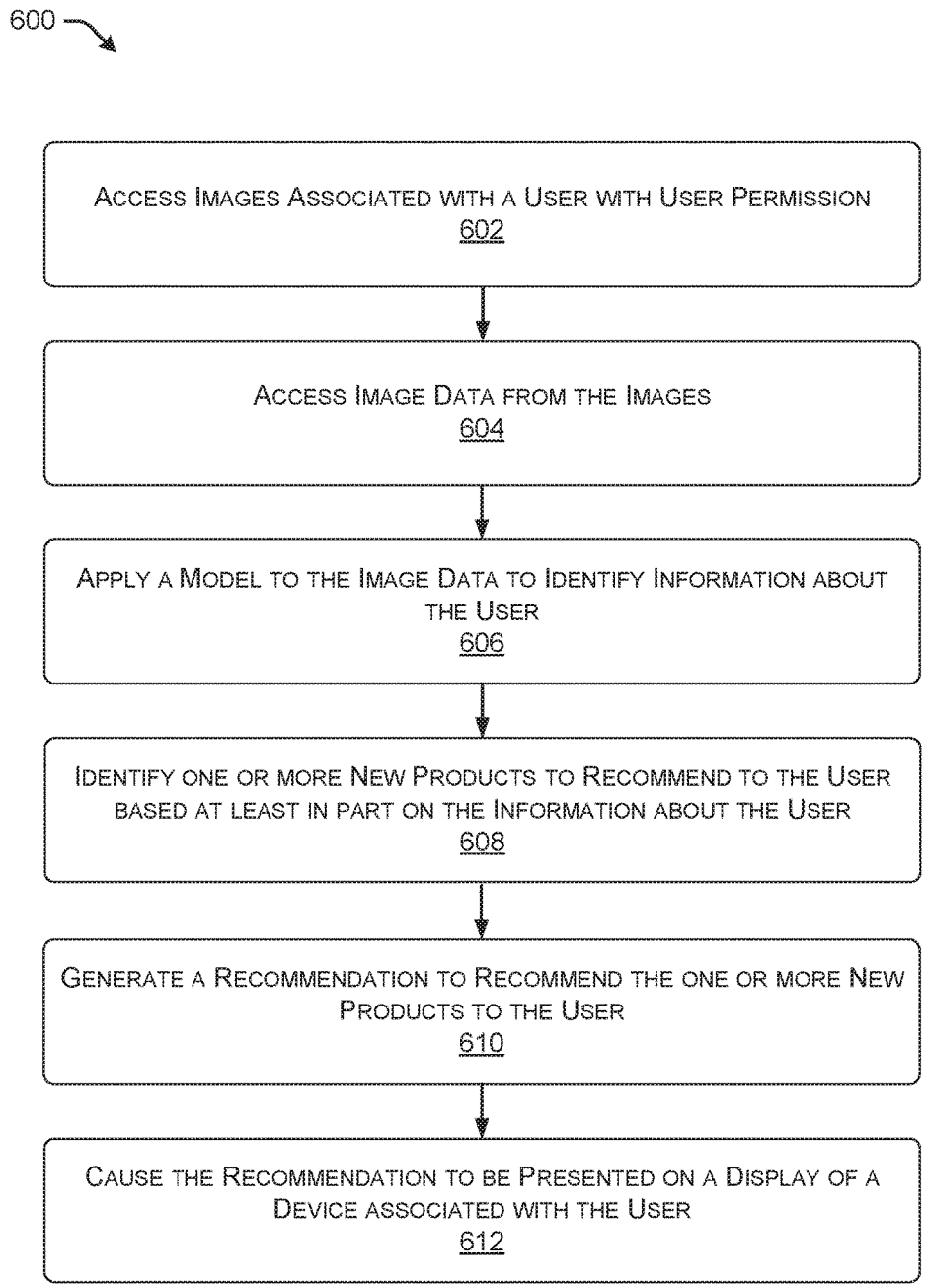
FIG. 6 is a flow diagram showing an illustrative process to generate and present recommendations to recommend one or more new products to a user.

FIG. 6 is a flow diagram showing an illustrative process 600 to generate and present recommendations to recommend one or more new products to a user 106 (e.g., consumer).

Block 602 illustrates accessing images associated with a user 106 (e.g., consumer). The image processing module 120 may access images from various sources such as social networking application services, cloud storage repositories, local storage repositories, remote storage repositories, etc., as described above. Additionally and/or alternatively, the image processing module 120 may receive images that are input by users 106. For instance, a user 106 may upload one or more images via his or her device 108 and the image processing module 120 may access the uploaded one or more images.

Block 604 illustrates accessing image data associated with the images, as described above. As described above, image data may include metadata. The metadata may include technical metadata, descriptive metadata, administrative metadata, etc. Technical metadata may include image capturing details and settings, image capturing device brand and model, date and time that the image was captured, and/or Global Positioning System (GPS) location (i.e., geotags) where the image was created (as determined by geolocation devices). Descriptive metadata may include a name of an image creator, keywords related to the image, captions, titles, comments, etc. Keywords may identify one or more subjects depicted in an image, objects depicted in an image, activities depicted in an image, geographical locations depicted in an image, scenes depicted in an image, seasons depicted in an image, events depicted in an image, etc. Administrative metadata may include various rights, restrictions on use, contact information for an owner of the image, etc.

Block 606 illustrates applying a model to the image data associated with the images to identify information about the user 106 (e.g., consumer). As described above, one or more of the models 124 may leverage image data to determine information associated with the consumer. That is, the recommendation module 128 may leverage one or more of the models 124 to identify trends that are depicted in the images associated with the consumer. Based at least partly on the identified trends, the recommendation module 128 may identify preferences, likes, dislikes, etc. associated with the consumer.

Block 608 illustrates identifying one or more new products to recommend to the user 106 (e.g., consumer) based at least in part on the information about the user 106 (e.g., consumer). Based at least in part on identifying preferences, likes, dislikes, etc. about consumers, the recommendation module 128 may recommend new products to the consumer, as described above. In some examples, the recommendation module 128 may identify products that might be of interest to a consumer based at least in part on identifying that a number of images associated with the same and/or similar image data exceeds a threshold number. For instance, based at least in part on determining that a number of images associated with descriptive metadata identifying a same subject and/or a same activity exceeds a predetermined threshold, the recommendation module 128 may identify that the consumer likes the subject or the activity and may identify products that might be of interest to the consumer consistent with the subject or the activity.

Block 610 illustrates generating a recommendation to recommend the one or more new products to the user 106 (e.g., consumer). The presentation module 132 may generate recommendations to recommend a product to a consumer and may cause the recommendations to be presented to the consumer via a display 136 of a device 108.

Block 612 illustrates causing the recommendation to be presented via a display of a device 108 associated with the user 106 (e.g., consumer). In at least one example, the presentation module 132 may generate recommendations to recommend a product to a consumer and may cause the recommendations to be presented to the consumer via a display 136 of a device 108. For instance, the presentation module 132 may cause the recommendations to be presented to the consumer via a unique user interface that provides functionality for the consumer to view the recommendation and/or acquire the one or more products associated with the recommendation, a text message, an email, a push notification, etc. Additionally and/or alternatively, a recommendation may include one or more composite images, as described above. The presentation module 132 may cause recommendations to be presented to a consumer in predetermined time intervals, at a predetermined frequency, on or before a date, etc.

Figure 7:
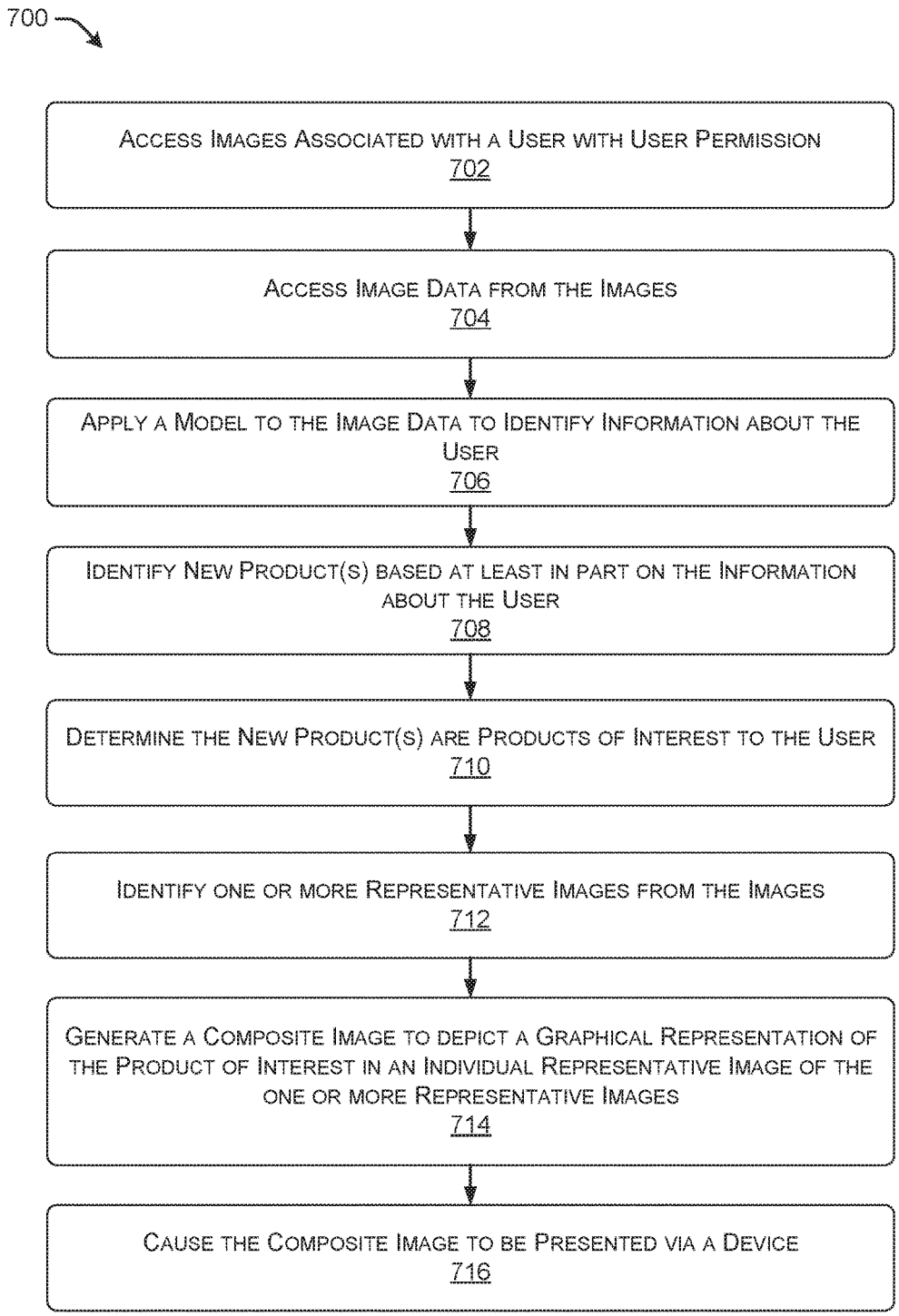
FIG. 7 is a flow diagram showing an illustrative process to generate and present a composite image to enhance online shopping experiences based at least partly on a product recommendation made based at least partly on images associated with a user.

FIG. 7 is a flow diagram showing an illustrative process 700 to generate and present a composite image to enhance online shopping experiences based at least partly on a product recommendation made based at least partly on images associated with a user 106 (e.g., consumer).

Block 702 illustrates accessing images associated with a user 106 (e.g., consumer). The image processing module 120 may access images from various sources such as social networking application services, cloud storage repositories, local storage repositories, remote storage repositories, etc., as described above. Additionally and/or alternatively, the image processing module 120 may receive images that are input by users 106. For instance, a user 106 may upload one or more images via his or her device 108 and the image processing module 120 may access the uploaded one or more images.

Block 704 illustrates accessing image data associated with the images. As described above, image data may include metadata, as described above. Additionally and/or alternatively, the image data may be based at least in part on characteristics of an image including quality of the image (e.g., resolution, brightness, saturation, etc.), clarity and/or saliency of subjects and/or objects in an image, size and/or scale of subjects and/or objects in an image, etc. Moreover, the image data may be based at least in part on the visibility of body regions (e.g., in an apparel example), etc. The recommendation module 128 can access the image data for identifying one or more new products to recommend to the user.

Block 706 illustrates applying a model to the image data associated with the images to identify information about the user 106 (e.g., consumer). As described above, one or more of the models 124 may leverage the image data to determine information associated with the consumer. That is, the recommendation module 128 may leverage one or more of the models 124 to identify trends that are depicted in the images associated with the consumer. Based at least partly on the identified trends, the recommendation module 128 may identify preferences, likes, dislikes, etc. associated with the consumer.

Block 708 illustrates identifying one or more new products to recommend to the user 106 (e.g., consumer) based at least in part on the information about the user 106 (e.g., consumer). Based at least in part on identifying preferences, likes, dislikes, etc. about consumers, the recommendation module 128 may recommend new products to the consumer, as described above. In some examples, the recommendation module 128 may identify products that might be of interest to a consumer based at least in part on identifying that a number of images associated with the same and/or similar image data exceeds a threshold number. For instance, based at least in part on determining that a number of images associated with descriptive metadata identifying a same subject and/or a same activity exceeds a predetermined threshold, the recommendation module 128 may identify that the consumer likes the subject or the activity and may identify products that might be of interest to the consumer consistent with the subject or the activity.

Block 710 illustrates determining that the one or more new products are products of interest to the user 106 (e.g., consumer). The product identification module 126 may determine that the one or more new products are products of interest to the consumer.

Block 712 illustrates identifying one or more representative images from the images. The image processing module 120 may identify representative images from the images. As described above, the appropriateness of an image for a particular product may be based on a fitness score determined based at least in part on applying image data and product data to one or more of the models 124. That is, one or more of the models 124 may output the fitness score. A high fitness score (e.g., a fitness score above a threshold value or within a pre-determined range of values) indicates an image is highly appropriate for a particular product and therefore may be a representative image. A low fitness score (e.g., a fitness score below a threshold value or outside a pre-determined range of values) indicates an image is not appropriate for a particular product and therefore may not be considered a representative image. Additional details associated with identifying one or more representative images are described in FIG. 5.

Block 714 illustrates generating a composite image to depict a graphical representation of the one or more products of interest in an individual representative image of the one or more representative images. The composite image generation module 130 may generate composite images, as described above. The composite image generation module 130 may augment a graphical representation of one or more products of interest into a representative image such that the graphical representations of the one or more products supplement the content of the representative image. In some examples, a graphical representation of a product (e.g., a lamp) may be augmented in a scene in the image so that a consumer may see how the product looks in the scene. In other examples, the graphical representations of one or more products of interest (e.g., apparel) may be augmented on top of a graphical representation of the consumer in the image so that the user 106 may see how he or she looks in the product. In such examples, the graphical representations of the one or more products of interest may augment the graphical representation of the consumer so as to conform or map to an outline of a graphical representation corresponding to the consumer so that the consumer appears to be wearing the one or more products of interest in the representative image. That is, the composite image generation module 130 may apply translations and scaling to graphical representations of products to ensure that the graphical representations are properly positioned.

Block 716 illustrates causing the composite image to be presented via a device 108 corresponding to the user 106 (e.g., consumer). The presentation module 132 may cause one or more composite images to be presented to the consumer via a display 136 of a device 108. For instance, the service provider may cause the one or more composite images to be presented to the consumer via a unique user interface that provides functionality for the consumer to view the one or more composite images and/or acquire the one or more products associated with the one or more composite images, a text message, an email, a push notification, etc. In at least one example, the one or more composite images may be added to a product page, as described above, and as illustrated in FIG. 4.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
one or more processors; and
a memory that stores one or more computer-executable instructions that are executable by the one or more processors to cause the system to perform operations comprising:
  accessing images depicting a user from social networking application services;
  identifying a garment of interest to the user based at least in part on the garment of interest being included in at least one of a saved-items list associated with the user, a browsing history associated with the user, a search history associated with the user, or user interaction with a user interface that is presented via a device associated with the user and is configured to enable the user to acquire the garment of interest;
  identifying a representative image from the images by:
    accessing product data associated with the garment of interest, the product data identifying at least one of activities associated with the garment of interest, geographic locations associated with the garment of interest, scenes associated with the garment of interest, or seasons associated with the garment of interest;
    accessing image data associated with the images, the image data identifying at least one of content of the images or characteristics of the images;
    applying a model to the product data and the image data to generate a fitness score for the images; and
    selecting an image of the images as the representative image based at least in part on a determination that the image is associated with a highest fitness score of the fitness scores;
  generating a composite image by augmenting the representative image with a graphical representation of the garment of interest; and
  causing the composite image to be presented to the user via the user interface that is presented via the device.

2. The system of claim 1, the operations further comprising causing the graphical representation to be rendered in the representative image such that the graphical representation conforms to an outline of a representation of the user.

3. The system of claim 1, the operations further comprising generating the fitness score based at least in part on a similarity between the image data and the product data, the similarity including at least one of same activities associated with the garment of interest and the image, same geographic locations associated with the garment of interest and the image, same scenes associated with the garment of interest and the image, or same seasons associated with the garment of interest and the image.

4. A method comprising:
accessing one or more images associated with a user;
identifying a product of interest to the user;
determining a fitness score for an image of the one or more images, the fitness score indicating an appropriateness of the image for presenting the product of interest via a device associated with the user;
selecting the image as a representative image based at least in part on the fitness score;
generating, by augmenting the representative image with a graphical representation of the product of interest, a composite image that visually depicts the graphical representation of the product of interest; and
causing the composite image to be presented via the device.

5. The method of claim 4, wherein accessing the one or more images comprises accessing the one or more images from at least one of social networking application services, cloud storage repositories, local storage repositories, or remote storage repositories.

6. The method of claim 4, further comprising:
processing the one or more images to identify preferences of the user;
recommending one or more new products to the user based at least in part on the preferences; and
identifying a new product of the one or more new products as the product of interest.

7. The method of claim 4, further comprising identifying the product of interest based at least in part on at least one of:
information and actions associated with a retail purchase account corresponding to the user; or
interactions between the user and a user interface configured to enable the user to acquire the product of interest.

8. The method of claim 4, wherein determining the fitness score comprises:
accessing product data associated with the product of interest, the product data identifying at least one of activities associated with the product of interest, geographic locations associated with the product of interest, scenes associated with the product of interest, events associated with the product of interest, or seasons associated with the product of interest;
accessing image data associated with the image, the image data identifying at least one of content of the image or characteristics of the image; and
applying a model to the product data and the image data to generate the fitness score.

9. The method of claim 4, further comprising determining a second fitness score for a second image of the one or more images, the second fitness score indicating a second appropriateness of the second image for presenting the product of interest via the device.

10. The method of claim 9, wherein selecting the image as the representative image is based at least in part on a determination that the fitness score is greater than the second fitness score.

11. The method of claim 9, further comprising selecting the image and the second image as representative images based at least in part on a determination that the fitness score and the second fitness score are above a threshold fitness score.

12. The method of claim 4, wherein causing the composite image to be presented via the device comprises:
generating a user interface configured to enable the user to acquire the product of interest; and
causing the composite image to be presented via the user interface on the device.

13. A system comprising:
one or more processors; and
a memory that stores one or more computer-executable instructions that are executable by the one or more processors to cause the system to perform operations comprising:
accessing one or more images associated with a user;
determining a product of interest to the user;
accessing product data associated with the product of interest;
accessing image data associated with an image of the one or more images, the image data identifying at least one of content of the image or characteristics of the image;
applying a first model to the product data and the image data to generate a fitness score for the image;
selecting the image as a representative image based at least in part on a determination that the fitness score is a highest fitness score for the product of interest; and
generating a composite image based at least in part on augmenting the representative image with a graphical representation corresponding to the product of interest.

14. The system of claim 13, wherein the image data further comprises at least one of first data associated with a quality of the image, second data associated with a saliency of subjects or objects depicted in the image, third data associated with a size of the subjects or the objects depicted in the image, fourth data associated with a scale of the subjects or the objects depicted in the image, or fifth data associated with a visibility of certain body regions depicted in the image.

15. The system of claim 13, wherein the image data further comprises at least one of first data associated with subjects depicted in the image, second data associated with objects depicted in the image, third data associated with activities depicted in the image, fourth data associated with geographical locations depicted in the image, fifth data associated with scenes depicted in the image, sixth data associated with events depicted in the image, or seventh data associated with seasons depicted in the image.

16. The system of claim 15, the operations further comprising:
applying a second model to the image data to determine at least one of interests or preferences of the user;
determining one or more products to recommend to the user based at least in part on the at least one of the interests or the preferences of the user;
determining a recommendation that identifies the one or more products to the user; and
causing the recommendation to be presented via a display of a device corresponding to the user.

17. The system of claim 16, the operations further comprising determining that the product of interest is one of the one or more products.

18. The system of claim 13, the operations further comprising:
determining a second product of interest to the user, the second product of interest being related to the product of interest;

accessing second product data associated with the second product of interest;

applying the first model to the second product data in addition to the product data and the image data to generate the fitness score for the image; and generating the composite image based at least in part on augmenting the representative image with a second graphical representation corresponding to the second product of interest.

19. The system of claim 13, the operations further comprising:

determining a second product of interest to the user, the second product of interest being related to the product of interest;

accessing second product data associated with the second product of interest;

applying the first model to the second product data and second image data associated with a second image of the one or more images to generate a second fitness score for the second image;

selecting the second image as a second representative image based at least in part on a determination that the second fitness score is above a pre-determined threshold value;

determining that the second image is a same image as the image; and generating the composite image based at least in part on augmenting the representative image with a second graphical representation corresponding to the second product of interest.

20. The system of claim 13, wherein the product of interest is a garment and the operations further comprise causing the graphical representation to be rendered in the representative image such that the graphical representation conforms to an outline of a representation of the user.

* * * * *